(12) United States Patent
Liao

(10) Patent No.: US 6,203,256 B1
(45) Date of Patent: Mar. 20, 2001

(54) COLUMN AND Z-AXIS SLIDE MOUNTING ARRANGEMENT FOR A VERTICAL CUTTING METAL-WORKING MACHINE

(76) Inventor: Y-Chung Liao, P.O. Box 82-144, Taipei (TW)

( * ) Notice: Subject to any disclaimer, the term of this patent is extended or adjusted under 35 U.S.C. 154(b) by 0 days.

(21) Appl. No.: 09/275,088

(22) Filed: Mar. 24, 1999

(51) Int. Cl.[7] ................................................. B23C 1/06
(52) U.S. Cl. ........................ 409/235; 408/234; 409/185
(58) Field of Search .................................... 409/235, 237, 409/241, 185; 408/234, 235

(56) References Cited

U.S. PATENT DOCUMENTS

| 21,002 | * | 1/1858 | Hinds | 408/234 |
|---|---|---|---|---|
| 3,587,391 | * | 6/1971 | Pitts | 408/235 |
| 3,752,596 | * | 8/1973 | Weyand et al. | 408/234 |
| 3,998,127 | * | 12/1976 | Romeu | 409/225 |
| 4,382,728 | * | 5/1983 | Anderson et al. | 409/235 |
| 4,534,093 | * | 8/1985 | Jahnke et al. | 409/235 |
| 4,621,407 | * | 11/1986 | Suzuki | 409/235 |
| 5,263,800 | * | 11/1993 | Chen | 408/234 |
| 5,669,867 | * | 9/1997 | Hoppe | 409/235 |
| 5,893,690 | * | 4/1999 | Haninger | 409/235 |

* cited by examiner

Primary Examiner—Daniel W. Howell
(74) Attorney, Agent, or Firm—A & J

(57) ABSTRACT

A column and Z-axis slide mounting arrangement includes a column vertically disposed at one side of the work table of a vertical cutting metal-working machine, and a Z-axis slide coupled to the column to hold a rotary tool holder and a tool at the rotary tool holder, wherein the column has a vertical sliding groove at a front side wall thereof, the Z-axis slide has a coupling block formed integral with a back side wall thereof and protruded over a bottom side wall and coupled to the vertical sliding groove at the column, the coupling block having a mounting hole connected to a driving device for enabling the Z-axis slide to be moved up and down along the vertical sliding groove by the driving device.

1 Claim, 5 Drawing Sheets

COLUMN AND Z-AXIS SLIDE MOUNTING ARRANGEMENT FOR A VERTICAL CUTTING METAL-WORKING MACHINE

BACKGROUND OF THE INVENTION

1. Field of the Invention

The present invention relates to a vertical cutting metal-working machine, and more specifically to a column and Z-axis slide mounting arrangement for a vertical cutting metal-working machine.

2. Description of the Prior Art

A regular cutting metal-working machine, as shown in FIG. 1, is comprised of a work table 3, a column 1 vertically disposed at one side of the work table 3, a longitudinal slide mounted on the work table 3 and adjusted in Y-axis direction, a cross slide 4 mounted on the longitudinal slide to hold the workpiece to be processed and adjusted in X-axis direction, a vertical slide 2 mounted on the column 1 and adjusted in Z-axis direction, and a rotary tool holder 21 mounted in the vertical slide 2 to hold a metal cutting tool. Referring to FIGS. 2 and 3, the vertical slide 2 comprises two parallel rails 221 bilaterally longitudinally raised from its back side wall and defining a longitudinal coupling groove 22, and a longitudinal coupling flange 222 of smoothly arched cross section raised from its back side wall on the middle between the parallel rails 221. The longitudinal coupling flange 222 defines a longitudinal coupling hole 223 for coupling to drive means. The column 1 comprises a vertical track 11 of T-shaped cross section formed integral with its front side wall and connected to the work table 3 at right angles, and a longitudinal coupling groove 12 longitudinally formed at the front side wall of the vertical track 11 on the middle. During assembly process, the longitudinal coupling flange 22 of the vertical slide 2 is inserted into the coupling groove 12 at the vertical track 11 of the column 1, enabling the vertical track 11 to be inserted into the longitudinal coupling groove 22 of the vertical slide 2, then two locating plates 23 are respectively securely fastened to the parallel rails 221 of the vertical slide 2 and disposed in contact with the vertical track 11 at a back side, enabling the vertical slide 2 to be secured to and moved along the vertical track 11, and then the longitudinal center mounting hole 223 of the longitudinal coupling flange 222 of the vertical slide 2 is fixedly connected to a driving device 13 (for example a screw rod, hydraulic cylinder, etc.), for enabling the vertical slide 2 to be moved up and down along the vertical track 11 by the driving device 13. Further, wearing pads 24 are securely mounted on the vertical track 11 and respectively disposed in contact with the locating plates 23, enabling the locating plates 23 to be smoothly moved with the vertical slide 2 along the vertical track 11. This column and vertical slide (Z-axis slide) mounting arrangement has numerous drawbacks as outlined hereinafter.

1. Because the vertical slide 2 is a heavy metal frame having a heavy rotary tool holder 21 in it and, because the vertical slide 2 (the longitudinal coupling groove 22) has a limited height, the vertical slide 2 tends to vibrate when moved along the vertical track 11. In order to eliminate this problem, the height of the vertical slide 2 may be made relatively greater. However, the vertical stroke of the tool is relatively shortened if the height of the vertical slide 2 is made relatively greater without increasing the vertical length of the vertical track 11 of the column 1.

2. Because the two locating plates 23 are respectively securely fastened to the parallel rails 221 of the vertical slide 2 to support the vertical slide 2 on the vertical track 11, the locating plates 23 tend to be forced to deform, causing the vertical slide 2 unable to be smoothly moved along the vertical track 2.

3. Because the locating plates 23 are separately made and then respectively fastened to the rails 221 of the vertical slide 2 to support the vertical slide 2 on the vertical track 11, the coupling precision between the vertical slide 2 and the vertical track 11 is difficult to be accurately controlled.

SUMMARY OF THE INVENTION

The present invention has been accomplished to provide a column and Z-axis slide mounting arrangement which eliminates the aforesaid drawbacks. It is one object of the present invention to provide a column and Z-axis mounting arrangement which is practical and durable in use. A column and Z-axis slide mounting arrangement includes a column vertically disposed at one side of the work table of a vertical cutting metal-working machine, and a Z-axis slide coupled to the column to hold a rotary tool holder and a tool at the rotary tool holder, wherein the column has a vertical sliding groove at a front side wall thereof; the Z-axis slide has a coupling block formed integral with a back side wall thereof and protruded over a bottom side wall and coupled to the vertical sliding groove at the column, the coupling block having a mounting hole connected to a driving device for enabling the Z-axis slide to be moved up and down along the vertical sliding groove by the driving device.

DETAILED DESCRIPTION OF THE PREFERRED EMBODIMENT

Figure 1:
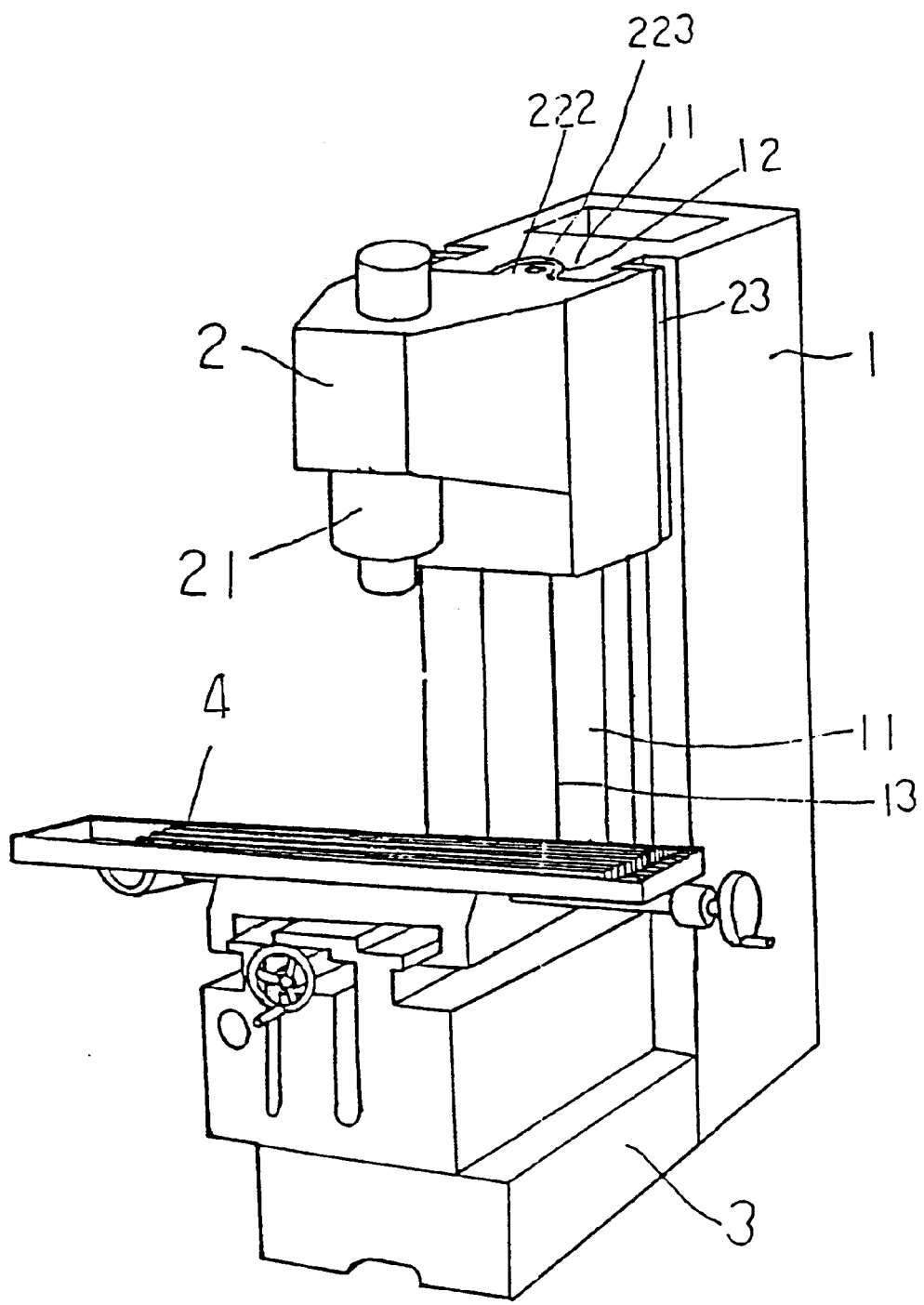
FIG. 1 is a perspective view of a vertical cutting metal-working machine according to the prior art.
Figure 2:
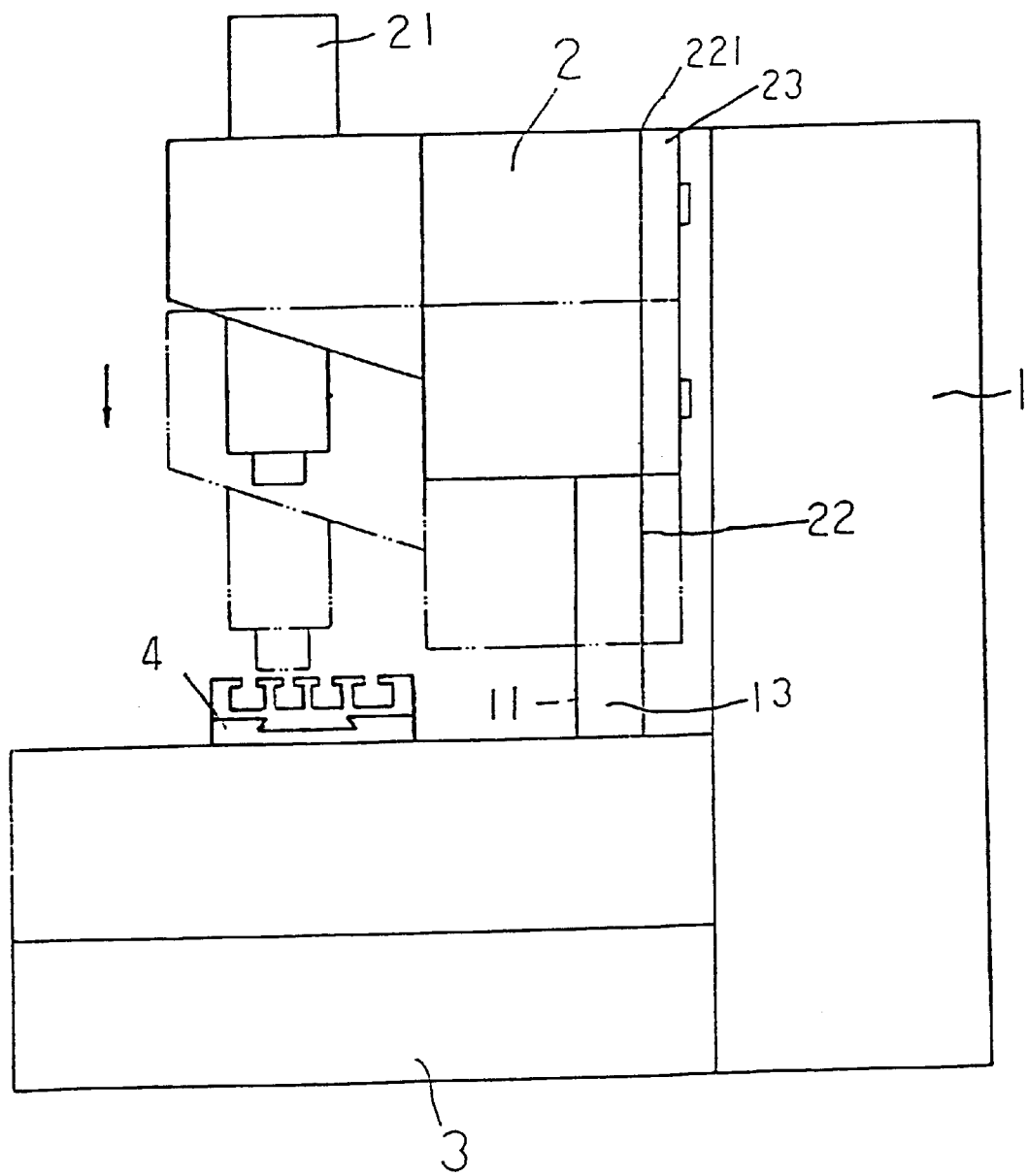
FIG. 2 is a side plain view of the vertical cutting metal-working machine shown in FIG. 1, showing the vertical slide moved along the vertical track at the column.
Figure 3:
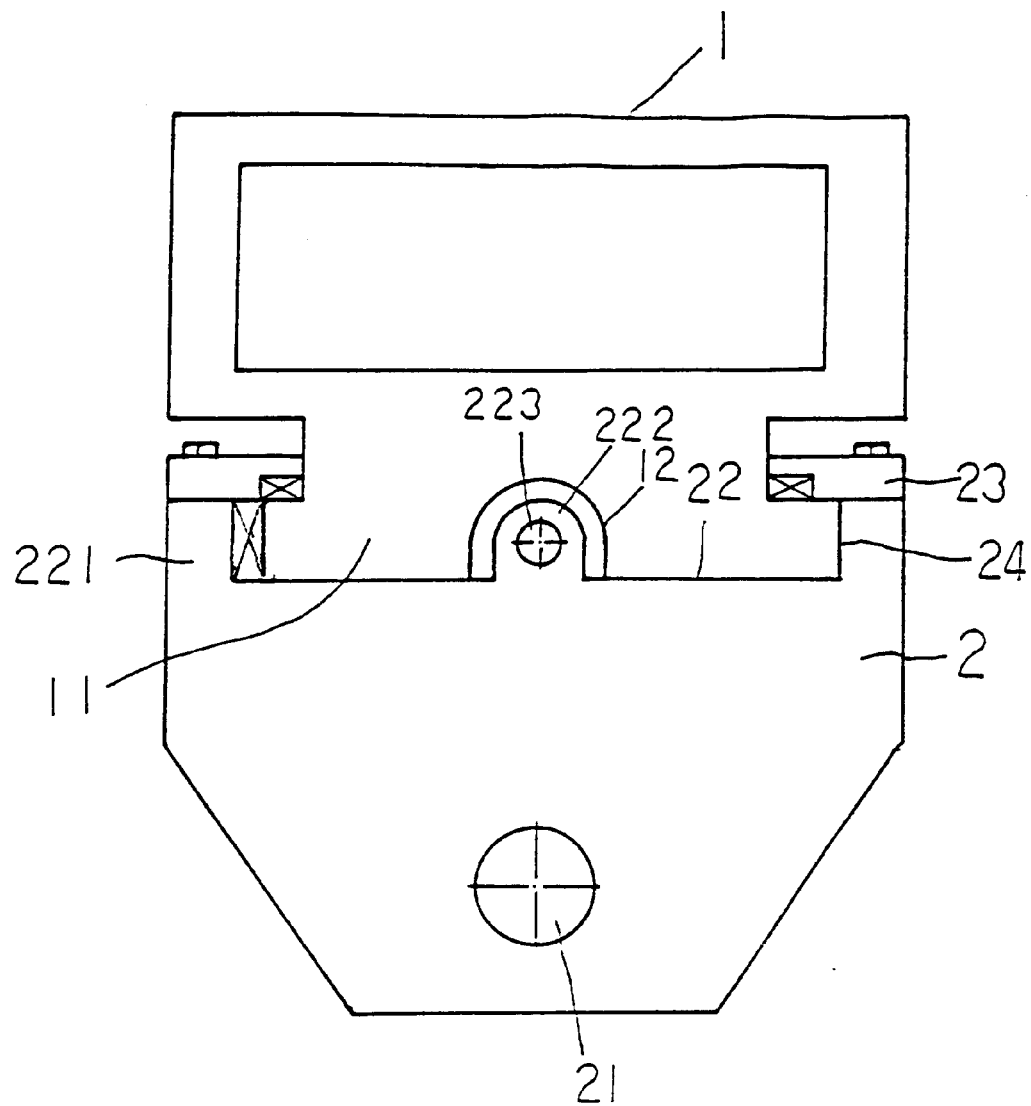
FIG. 3 is a top plain view showing the vertical slide coupled to the longitudinal track of the column according to the prior art.
Figure 4:
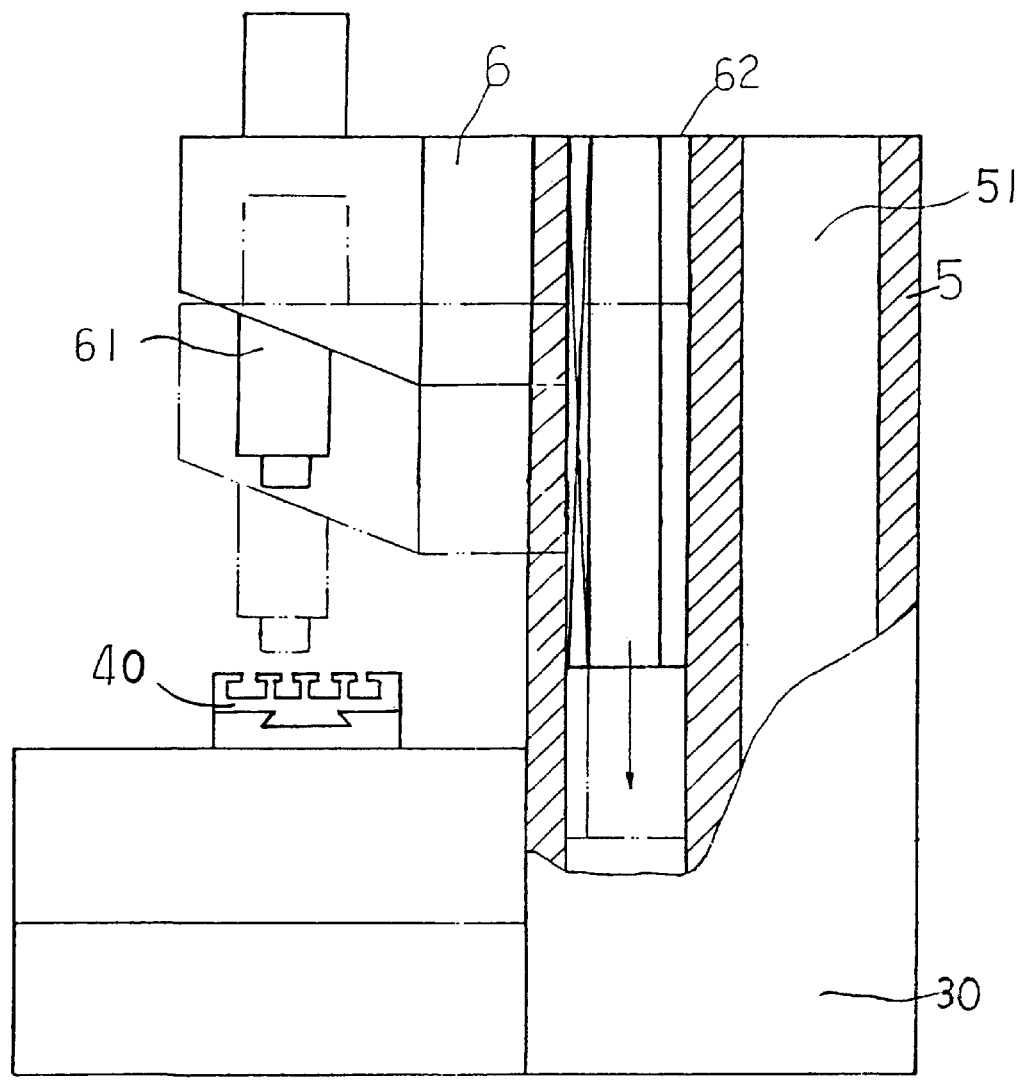
FIG. 4 is a side view of the present invention, showing the vertical (Z-axis) slide coupled to the column.
Figure 5:
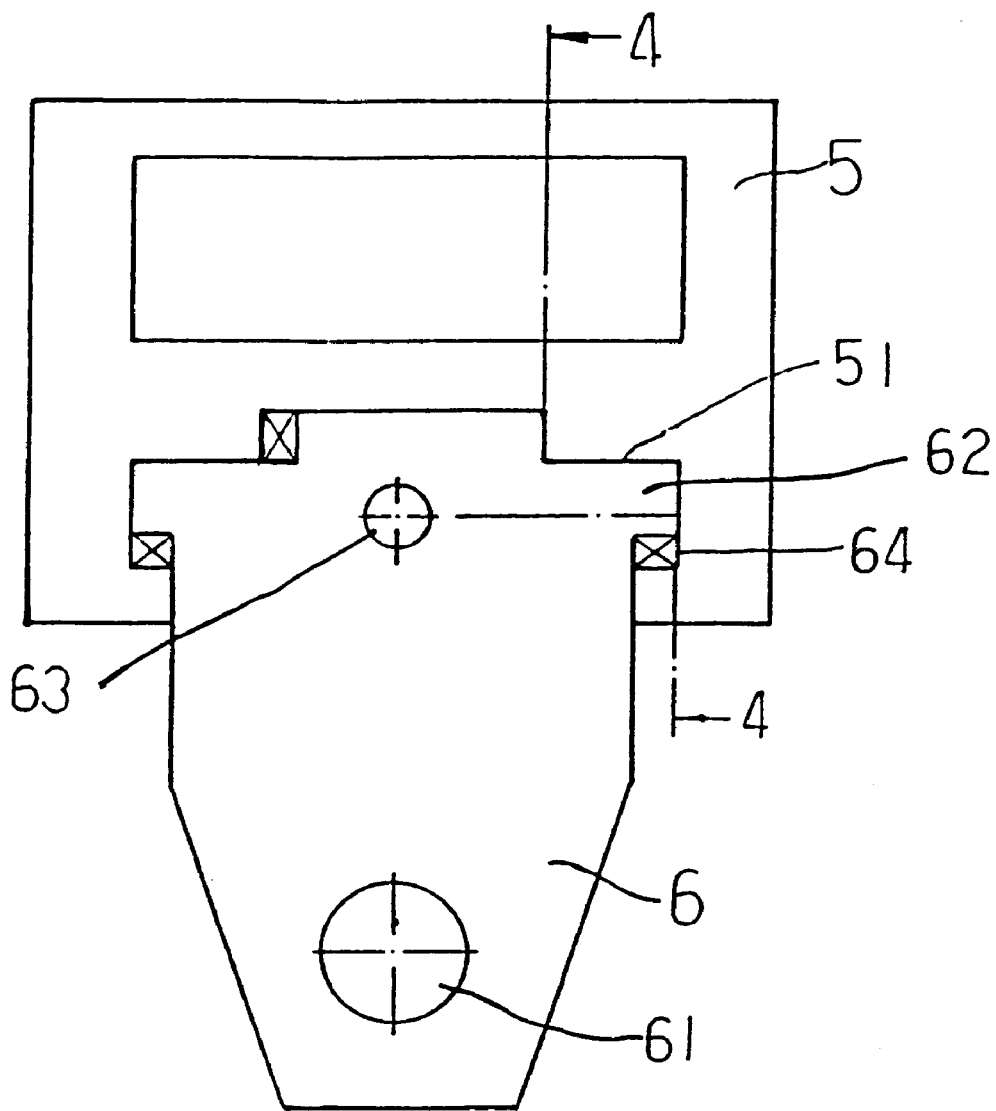
FIG. 5 is a top plain view of the present invention.

Referring to FIGS. 4 and 5, a vertical cutting metal-working machine is shown comprised of a work table 30, a column 5 connected to the work table 30 at one side at right angles, a longitudinal slide (not shown) mounted on the work table 30 and adjusted in Y-axis direction, a cross slide 40 mounted on the longitudinal slide to hold the workpiece to be processed and adjusted in X-axis direction, a vertical (Z-axis) slide 6 mounted on the column 5 and adjusted in Z-axis direction, and a rotary tool holder 61 mounted in the vertical slide 6 to hold a metal cutting tool.

Referring to FIGS. 4 and 5 again, the column 5 comprises a vertical sliding groove 51 of formed integral with the front side wall of the columns and extended between top and bottom ends thereof. The vertical (Z-axis) slide 6 comprises a coupling block 62 formed integral with its back side wall and protruded over its bottom side wall at a distance. The cross section of the coupling block 62 fits the vertical sliding groove 51. By inserting the coupling block 62 into the vertical sliding groove 51 from the top side, the vertical (Z-axis) slide 6 is secured to the column 5, and can be moved up and down along the vertical sliding groove 51. The coupling block 62 has a vertical mounting hole 63 for coupling to a driving device (for example a screw rod, hydraulic cylinder, etc.), for enabling the vertical (Z-axis) slide 6 to be moved up and down along the vertical sliding groove 51 by the driving device. Furthermore, wearing pads 64 are respectively securely covered on the peripheral walls of the coupling block 62 and disposed in contact with the peripheral wall of the vertical sliding groove 51, enabling the vertical (Z-axis) slide 6 to be smoothly moved up and down along the vertical sliding groove 51.

Because the vertical sliding groove 51 extended between top and bottom side ends of the column 5, the height (vertical length) of the coupling block 62 can be made longer than the height of the vertical (Z-axis) slide 6, enabling the vertical (Z-axis) slide to be stably supported on the column 5. When the vertical (Z-axis) slide 6 is moved to the lower limit position, the lower part of the coupling block 62 enters the inside of the work table 30. Therefore, the protruded design of the coupling block 62 does not hinder the movement of the vertical (Z-axis) slide 6. Because the coupling block 62 is formed integral with the vertical (Z-axis) slide 6, the structural strength of the vertical (Z-axis) slide 6 is maintained intact, and the vertical (Z-axis) slide 6 can be positively coupled to the column 5 and smoothly moved along the vertical sliding groove 51.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A column and Z-axis slide mounting arrangement for a vertical cutting metal-working machine comprising a column and a Z-axis slide coupled to said column and moveable vertically along said column to hold a rotary tool holder and a tool at the rotary tool holder, wherein said column comprises a vertical sliding groove formed at a front side wall thereof and extended between top and bottom ends thereof; said Z-axis slide comprises a coupling block formed integral with a back side wall of said Z-axis slide and protruded over a bottom side wall of said Z-axis slide at a distance and coupled to the vertical sliding groove of said column, said coupling block having a cross section fitting the cross section of said vertical sliding groove, and a vertical mounting hole connected to a driving device for enabling said Z-axis slide to be moved up and down along said vertical sliding groove by the driving device.

* * * * *